United States Patent
Casey et al.

(10) Patent No.: US 8,394,164 B2
(45) Date of Patent: Mar. 12, 2013

(54) SEPARATOR ARRANGEMENT FOR GAS/LIQUID SEPARATION; APPARATUS; AND, METHODS

(75) Inventors: Michael James Casey, Eden Prairie, MN (US); Brian Read, Eagan, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 13/452,069

(22) Filed: Apr. 20, 2012

(65) Prior Publication Data

US 2012/0240767 A1    Sep. 27, 2012

Related U.S. Application Data

(63) Continuation of application No. 10/579,455, filed as application No. PCT/US2004/038369 on Nov. 16, 2004, now Pat. No. 8,182,569.

(60) Provisional application No. 60/520,906, filed on Nov. 17, 2003.

(51) Int. Cl.
B01D 50/00 (2006.01)
(52) U.S. Cl. ............... 55/486; 55/424; 55/466; 55/487; 55/510; 55/502; 55/498; 55/428; 55/485; 55/DIG. 17
(58) Field of Classification Search ......... 55/486, 55/424, 466, 487, 510, 502, 498, 428, 485, 55/DIG. 17
See application file for complete search history.

(56) References Cited

U.S. PATENT DOCUMENTS

| | | |
|---|---|---|
| 2,630,131 A | 3/1953 | Rush |
| 2,771,153 A | 11/1956 | Hennig |
| 2,952,332 A | 9/1960 | Metro |
| 3,524,304 A | 8/1970 | Wittemeier et al. |
| 3,708,965 A | 1/1973 | Domnick |
| 3,891,418 A | 6/1975 | Burger et al. |
| 4,111,815 A | 9/1978 | Walker et al. |
| 4,355,742 A | 10/1982 | Scholle |
| 4,516,994 A | 5/1985 | Kocher |
| 4,632,682 A | 12/1986 | Erdmannsdorfer |
| 4,661,131 A | 4/1987 | Howeth |
| 4,692,175 A | 9/1987 | Frantz |
| 4,872,890 A | 10/1989 | Lamprecht et al. |
| 5,129,923 A | 7/1992 | Hunter et al. |
| 5,730,766 A | 3/1998 | Clements |
| 5,800,584 A | 9/1998 | Hinderer et al. |
| 5,803,941 A | 9/1998 | Berkhoel et al. |
| 6,093,231 A | 7/2000 | Read et al. |
| 6,136,076 A | 10/2000 | Read |
| 6,364,921 B1 | 4/2002 | Raether et al. |
| 6,387,142 B1 | 5/2002 | Pieciak et al. |
| 6,387,162 B1 | 5/2002 | Kosmider et al. |
| 6,419,721 B1 | 7/2002 | Hunter |
| 6,485,535 B1 | 11/2002 | Linnersten et al. |
| 6,485,544 B1 | 11/2002 | Ziske |
| 6,488,746 B1 | 12/2002 | Kosmider et al. |
| 6,572,667 B1 | 6/2003 | Greif et al. |

(Continued)

FOREIGN PATENT DOCUMENTS

| | | |
|---|---|---|
| CN | 1438912 A | 8/2003 |
| EP | 0 923 975 A1 | 6/1999 |

(Continued)

*Primary Examiner* — Jason M Greene
*Assistant Examiner* — Dung H Bui
(74) *Attorney, Agent, or Firm* — Merchant & Gould P.C.

(57) ABSTRACT

A serviceable gas/liquid separator is provided. The gas/liquid separator has a cross-section with one long axis and one short axis, with an aspect ratio of at least 1.3. A preferred cross-section, is an elliptical cross-section. Assemblies in which the separator unit can be used, are provided. In addition methods of use and construction are provided.

32 Claims, 11 Drawing Sheets

U.S. PATENT DOCUMENTS

| | | |
|---|---|---|
| 6,585,790 B2 | 7/2003 | Linnersten et al. |
| 6,797,025 B2 | 9/2004 | Linnersten et al. |
| D499,177 S | 11/2004 | Kosmider et al. |
| 6,916,353 B2 | 7/2005 | Tang |
| 6,923,851 B1 * | 8/2005 | Butler et al. .................... 96/135 |
| 6,936,084 B2 | 8/2005 | Schlensker et al. |
| 7,081,145 B2 | 7/2006 | Gieseke et al. |
| 7,332,009 B2 | 2/2008 | Casey et al. |
| 2002/0178921 A1 | 12/2002 | Kosmider et al. |
| 2003/0051450 A1 | 3/2003 | Linnersten et al. |
| 2004/0031252 A1 | 2/2004 | Heikamp |
| 2004/0035097 A1 | 2/2004 | Schlensker et al. |
| 2005/0039601 A1 | 2/2005 | Kosmider et al. |
| 2005/0120687 A1 | 6/2005 | Casey et al. |
| 2006/0108280 A1 | 5/2006 | Jodi |
| 2006/0123744 A1 | 6/2006 | Read |
| 2008/0245037 A1 | 10/2008 | Rogers et al. |
| 2008/0250772 A1 | 10/2008 | Becker et al. |

FOREIGN PATENT DOCUMENTS

| | | |
|---|---|---|
| GB | 2 195 558 A | 4/1988 |
| JP | A-S51-137173 | 11/1976 |
| JP | S53-122778 | 9/1978 |
| JP | S60-074723 | 5/1985 |
| JP | A-H09-253436 | 9/1997 |
| JP | A-2002-504416 | 2/2002 |
| JP | A-2002-527231 | 8/2002 |
| WO | WO 98/43723 | 10/1998 |
| WO | WO 99/43412 | 2/1999 |
| WO | WO 02/02206 | 1/2002 |
| WO | WO 02/38247 | 5/2002 |
| WO | WO 2004/052503 | 6/2004 |
| WO | WO 2004/089509 | 10/2004 |
| WO | WO 2006/078787 A2 | 7/2006 |

* cited by examiner

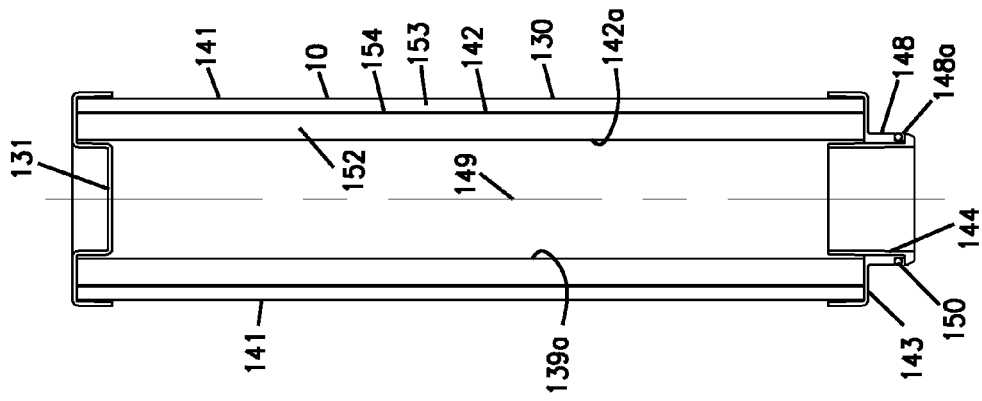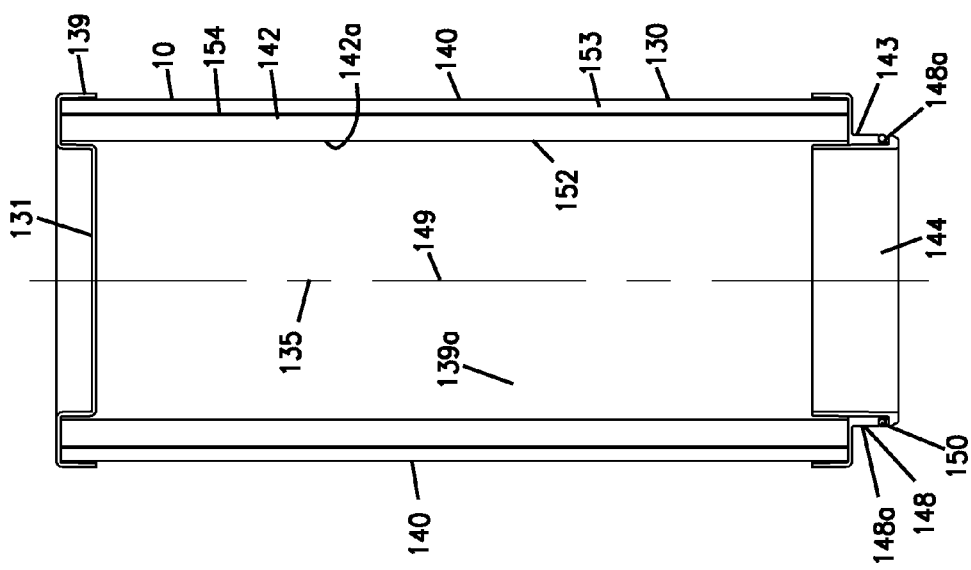

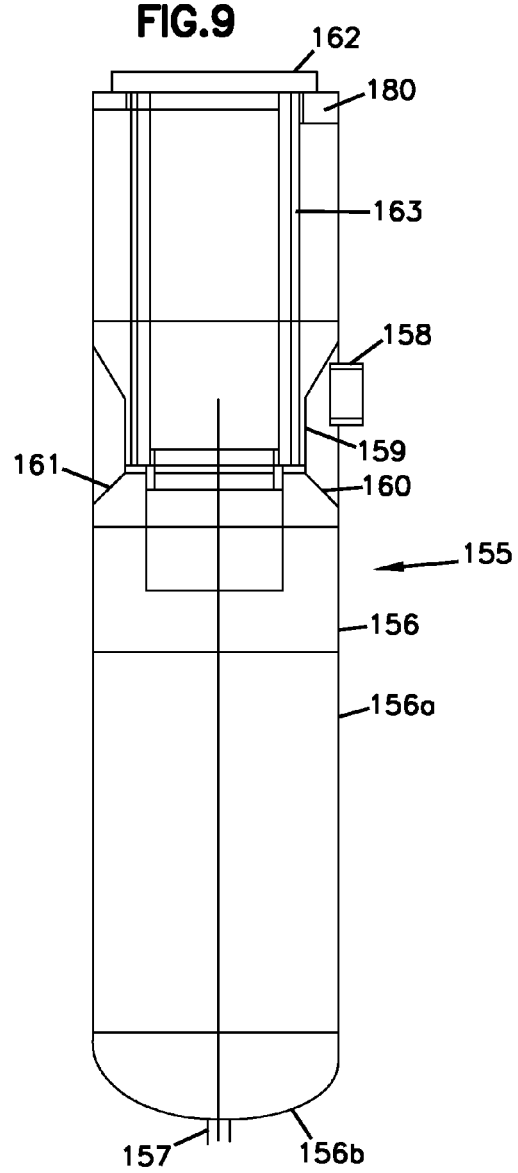
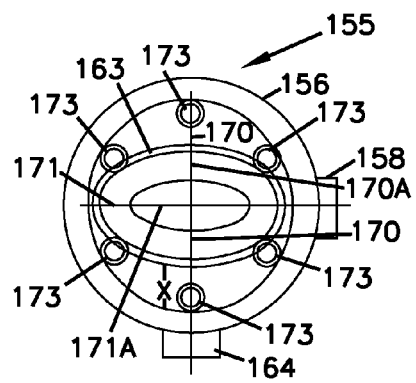

SEPARATOR ARRANGEMENT FOR GAS/LIQUID SEPARATION; APPARATUS; AND, METHODS

This application is a Continuation of U.S. Application Ser. No. 10/579,455, filed Oct. 14, 2008, which is a National Stage Application of PCT/US2004/038369, filed Nov. 16, 2004, which claims benefit of U.S. Provisional Application No. 60/520,960, filed 17 Nov. 2003 and which applications are incorporated herein by reference. To the extent appropriate, a claim of priority is made to each of the above disclosed applications.

FIELD OF THE INVENTION

The present disclosure relates to gas/liquid separation. The disclosure particularly concerns serviceable separator arrangements for use in conducting gas/liquid separation. It also concerns apparatus or systems in which such separators are used, methods of operation and separation, and methods of assembly. A particular, useful, application is as an air/oil separator for air compressors.

BACKGROUND

A variety of equipment types and systems utilize gas/liquid separation assemblies. Examples include: compressors and compressed air systems; and, industrial mist collectors.

In general, such assemblies include a removable and replaceable (i.e., serviceable) separator unit, construction or arrangement. In some assemblies a single serviceable separator element is used as the separator element construction; and in others, multiple serviceable elements are used. In general, operation involves directing a gas/liquid flow through the separator unit, i.e., through the serviceable separator element or elements. Within the separator unit, liquid coalescing and drainage occurs. As a result, an entrained liquid concentration, within the gas stream, is reduced. Periodically, the serviceable element(s) are removed and replaced.

SUMMARY

Herein, techniques applicable for using gas/liquid separation assemblies are provided. The techniques include provision of unique gas/liquid separator elements, with respect to outer and/or inner shapes.

Other techniques provided herein include preferred orientation of gas/liquid separator element(s) within separator arrangement; preferred internal constructions for separator arrangements; and, preferred element definition. Methods of assembly and use are also provided.

BRIEF DESCRIPTION OF THE DRAWINGS

FIG. 7 is a cross-sectional view taken along line 7-7, FIG. 6.

FIG. 8 is a cross-sectional view taken along line 8-8, FIG. 6.

FIG. 9 is a schematic cross-sectional view of a gas/liquid separator assembly having a single serviceable separator element therein.

FIG. 10 is a top view of the assembly depicted in FIG. 9, with the top cover removed.

DETAILED DESCRIPTION

I. General Background

Figure 1:
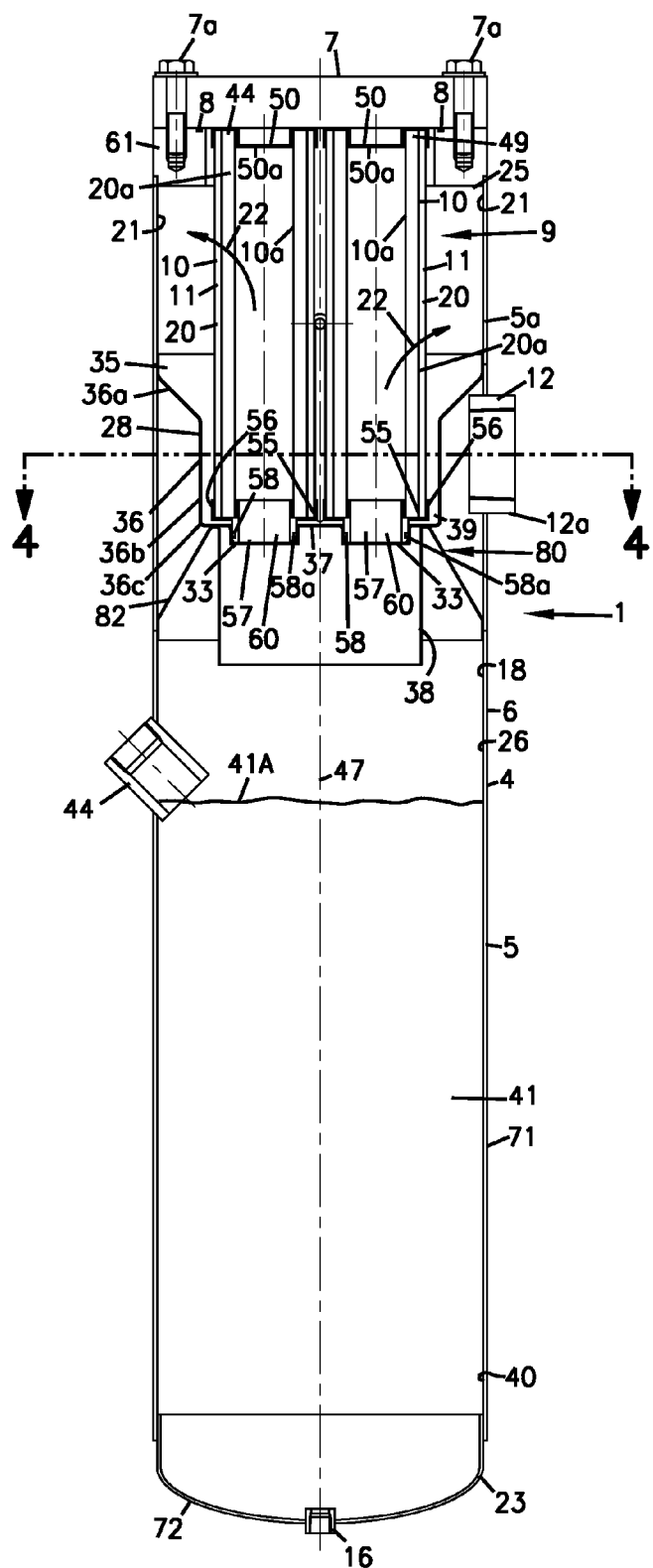
FIG. 1 is a cross-sectional view of an air/oil separator assembly including two serviceable separator elements, according to the present disclosure.

In general, a component of typical gas/liquid separator arrangements of the type of concern herein, is the removable and replaceable, i.e., serviceable, separator arrangement. The removal and replaceable, (i.e., serviceable) separator arrangement generally comprises one or more separators (or separator elements) that, in time (due to operation of the gas/liquid separation assembly) are removed and replaced during servicing operation; hence the term "serviceable." Typically, each serviceable separator element includes a media pack, through which the gases are passed. Each media pack typically includes layers or stages of media for conduct of coalescing and drain steps.

Herein, gas/liquid separator assemblies or separator elements will be characterized or classified as either "in-to-out flow" or "out-to-in flow," depending on whether, in use, during gas flow through the media pack of each separator element, gas flow is directed from outside of the serviceable separator element(s) to an interior; or, from an interior of the serviceable separator element(s) to an exterior.

The techniques described herein can be applied to either or both. The examples depicted in the drawings relate to in-to-out flow arrangements.

The principles described herein, with respect to gas/liquid separation, can be applied in many arrangements, with one type of typical application being as a gas/oil (specifically air/oil) separator for a compressor arrangement. Such an apparatus is generally adapted for operation with internal pressures on the order of about 60 psi to 200 psi (about 4.2-14.06 kilograms/square cm), for example about 80-120 psi (about 5.6-8.44 kilograms/square cm), typically about 100 psi (about 7 kilograms/square cm). Examples of use would be with compressors about 28 hp to 500 hp (about 14.9-373 Kw).

The through put for an air/oil separator for use in the compressor arrangement, is typically measured in terms of volume of free air (be non-compressed volume) passed through the separator assembly. A typical operating flow would be from on the order of 100 cubic feet per minute (47,000 cubic cm/second) up to several thousand cubic feet per minute (about 1 million cubic cm/second or more).

Herein some particular arrangements for air/oil separation in compressor systems are shown. The techniques and principles described herein can be applied in a variety of systems of a variety of sizes, for use with a wide variety of equipment types and sizes (for example a variety of compressors).

In some instances, the techniques described herein can be applied in other applications, for example in mist collection arrangements such as industrial mist collectors, or in air/water separators in compressed gas systems. Issues of application, merely relate to adaptation of the various techniques described herein, to such assemblies.

II. The Assembly of FIGS. 1-5

In FIGS. 1-5, a gas/liquid separator usable as an air/oil separator that includes a preferred separator element arrangement according to the present disclosure is depicted. The reference number 1, FIG. 1, generally designates a gas/liquid separator assembly according to one embodiment of the present disclosure. In general, the assembly 1 comprises: a vessel 4, in this instance a pressure vessel 5 including a housing 6 and top cover 7; and, an internally received, removable and replaceable or serviceable, separator unit 9, in this instance comprising two, serviceable, separator elements or separators 10. The particular separators 10 depicted are in-to-out flow separators 11, as will become apparent. An o-ring seal between the cover 7 and housing 6 is shown at 8. The cover 7 is secured in place by bolts 7a. Typically the bolts 7a would be positioned in a ring, on cover 7; and, typically six to twelve such bolts would be used.

In general, the pressure vessel 5 includes: a gas flow inlet 12; a gas flow outlet 13 (not viewable in FIG. 1, see FIG. 2); and, a liquid drain outlet 16. In operation, a gas stream having liquid therein, is directed into interior 18 of the assembly 1, through inlet 12. Within the assembly 1, the gas stream is eventually directed through media packs 20, of the separators 10, and is then passed outwardly from the pressure vessel 5, in this instance through gas flow outlet 13 (FIG. 2).

Figure 2:
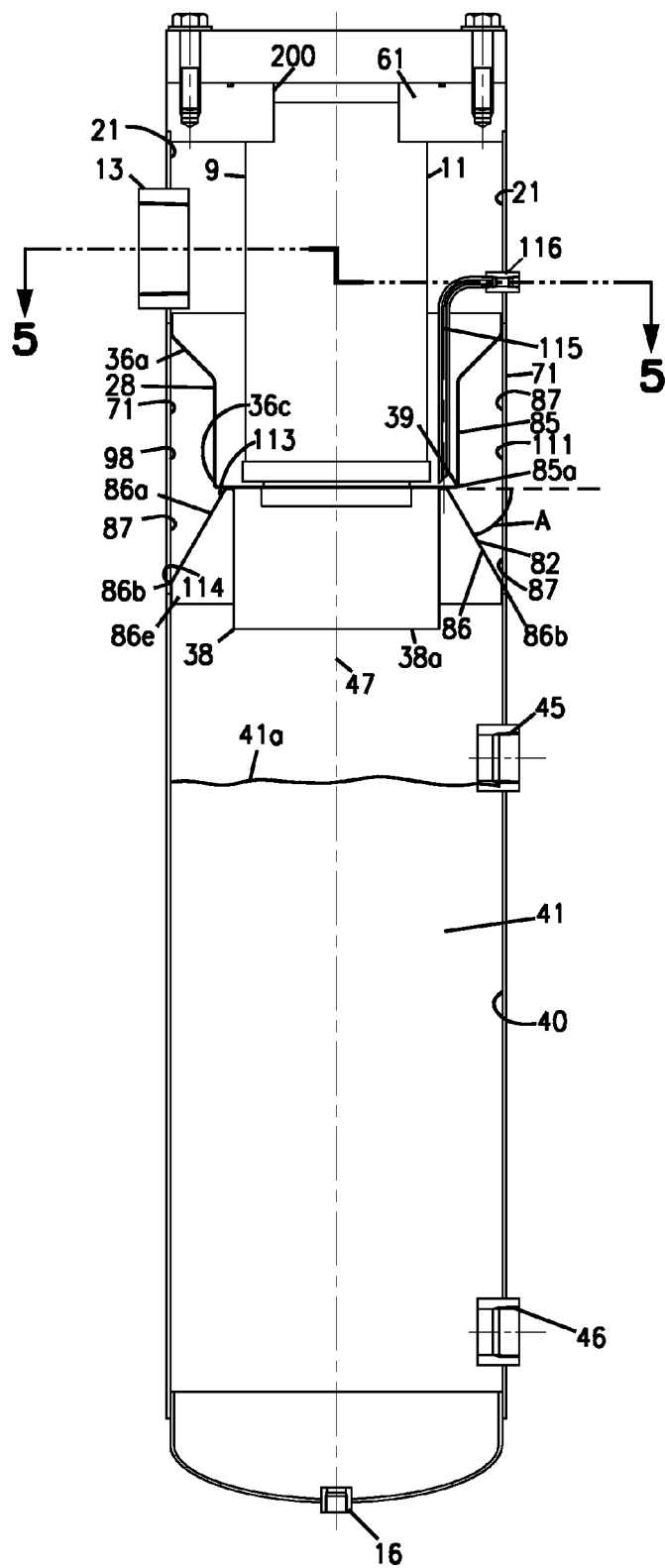
FIG. 2 is a cross-sectional view of the assembly depicted in FIG. 1, taken from an orientation at right angles to the view of FIG. 1.

The particular arrangement shown in FIG. 1, uses in-to-out flow separators 11. By this, it is meant that when the gases pass through the media packs 20 of the separators 10, they pass from the interior 10a of separators 10 (defined and surrounded by media packs 20) to an exterior region 21 as indicated generally by arrows 22.

Still referring to FIG. 1, for the assembly 1 depicted: the inlet 12 is a sidewall inlet 12a, meaning it extends through sidewall 5a; and, drain 16 is a bottom drain. By "bottom" in this context, reference is meant to a lower portion 23 of assembly 1 when oriented for typical use, as shown in FIG. 1. The term "sidewall" is meant to refer to the housing wall portion 5a which extends between cover 7 and the bottom 23.

To facilitate operation, the assembly 1 generally defines an enclosed upper region 25 and an enclosed lower region 26, in this instance separated by divider or tube sheet structure 28. The tube sheet structure 28 is generally solid and non-porous to gas flow there through, except in specified regions as defined. In this instance the tube sheet structure 28 defines two central apertures 33 therein. But for apertures 33, the tube sheet structure 28 is generally solid and preferably includes: an annular mounting flange 35; a depending central wall 36, in this instance having an upper funnel section 36a and a lower generally cylindrical section 36b; base 37, with central aperture 33 therein; and lower shroud 38. The base 37 is attached at lower edge 36c of wall 36. The lower shroud 38 depends from the base 37. The wall 36 and base 37 generally define an upper sump 39, discussed below. As will be understood from detailed description below, apertures 33 provide flow channels for gas flow from lower region 26 into upper region 25, specifically by flow direction into the separator unit 9; i.e. into the individual in-to-out flow separators 11.

The central wall 36 is preferably a radially continuous wall. By the term "radially continuous" in this context, it is meant that it extends continuously around a central axis 47. There is no specific requirement that the wall 36 have the funnel shaped portion 36a indicated. Such a configuration, however, is convenient for preferred sump definition and through put.

Lower region 26, of the vessel 5, includes lower sump region 40 in this instance depicted with liquid (oil) 41 therein. Much of the liquid initially included within the inlet gas flow, from gas flow inlet 12 drains to lower sump region 40, before the gases even pass through aperture 33 into upper region 25.

Figure 3:
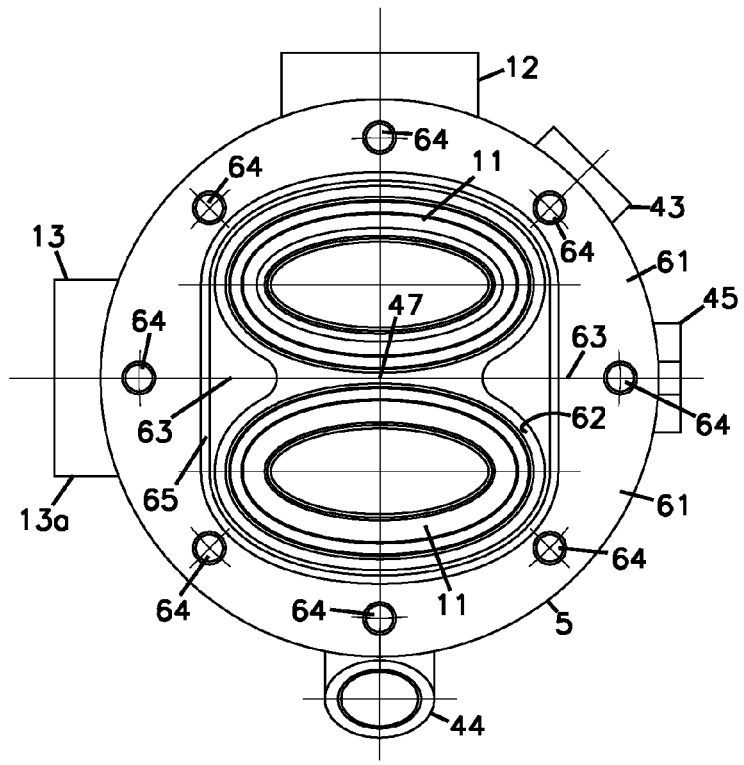
FIG. 3 is a top plan view of the assembly of FIG. 1, shown with the top cover removed.

Assembly 1 includes, in region 26, a lower sump filler pipe 44 (FIG. 1). The filler pipe 44 provides for an optional entry of liquid into lower sump 40 to facilitate operation, if desired, for example when the assembly 1 is first put on line. A sight glass 45 (FIG. 2) is provided, to observe liquid level. Oil return 46 (FIG. 2) can be used to provide for circulation. The arrangement 1 can also be provided with a relief valve tap 43, FIG. 3, if desired. Also temperature taps, not shown, can be provided. The particular size, number and location of taps and apertures is a matter of choice, for the particular operation intended. A preferred radial location (around central axis 47) of relief valve tap 43 relative to inlet 12 is shown in FIG. 3.

Referring to FIG. 1, in sump 40, an operating liquid (oil) level 41a is shown. In typical use, the amount of oil contained within sump 40 is a matter of choosing an appropriate oil volume that will lead to a desired average temperature or cooled temperature, appropriate for directing oil back to the mechanical system for the compressor of concern. A temperature probe, not shown, can be used to monitor this.

As indicated, separators 10 are removable and replaceable, i.e., serviceable, components. The separators 10 each comprise a media pack 20 (in this instance each has an elliptical media pack 20a, in cross-section) secured at one end 49 to an end cap 50. For the particular assembly shown in FIG. 1, each end cap 50 is a closed end cap 50a, meaning that it has no air flow aperture therethrough which communicates with interior 10a of the associated one of separators 10.

Each separator 10, at an end 55 opposite the end cap 50, includes an end cap 56 with central aperture 57 therein. The central aperture 57 is a gas flow aperture, for passage of gases into the interior 10a of the associated separator 10 during use. In general, each aperture 57 is aligned with one of the apertures 33, such that gas flow passing through aperture 33 from region 26 into region 25, is directed through apertures 57 into interior 10a of separator 10.

A variety of seal arrangements could be used at the juncture between each separator 10 and the tube sheet construction 28. For example, either a radial seal or an axial seal or both can be used. In the example shown in FIG. 1, a radial seal structure 58 is used.

For the example shown, each aperture 33 in the tube sheet arrangement 28, is surrounded by an axial wall section in the tube sheet structure 28. Each end cap 56, FIG. 1, includes an axially directed projection or spigot 60 thereon, projecting away from the associated media pack 20. Each radial seal structure 58 comprises an o-ring 58a mounted on an outside of the spigot 60. The sealing occurs when the spigot 60 is pushed into an associated receiver in the tube sheet structure 28.

Of course in the alternative, a radial seal could be formed with a cylindrical projection on the tube sheet structure 28, projecting into an opening in each open end cap.

The term "radial" when used herein reference to a seal, is meant to refer to a seal positioned for sealing pressure directed radially toward or away from central axis 47. The term "axial" when used in connection with a seal, is meant to refer to a seal with a sealing force directed in the general direction of the longitudinal extension of the system longitudinal axis 47. For example the o-ring 8 provides for an axial seal.

In general, if the separators 10 were provided with axial seals, a seal ring could be provided projecting axially outwardly from each end cap 56. This seal would be positioned to engage a portion of base 37, during sealing. An arrangement to provide pressure would be needed, to ensure the seal. This pressure could be provided by the cover 7, or by alternate constructions. (Of course alternate axial seals could involve gaskets separate from the elements.)

Referring to FIG. 1, it is noted that in some instances the axial length of separators 10 may be slightly shorter than the distance between cover 7 and base 37. In use, the separators 10 would be installed as described, by hand, through an opening with cover 7 removed. Cover 7 would then be installed (bolted) in place. Under operating pressures, the separators 10 would typically be biased until they bump against cover 7. The radial seal arrangement would be configured to allow for this movement, without loss of seal. Construction in this manner facilitates manufacture of the separators 10, since tight manufacturing tolerances for length would not be critical.

Attention is now directed to FIG. 3. In FIG. 3, the assembly 1 is depicted with a top cover 7 (FIG. 1) removed. One can see an upper surface piece 61. The upper surface piece 61 includes a somewhat hourglass shape aperture therein 62, shaped to define around the outside of the separator elements 11, with projections 63 extending partially between the elements. The hourglass shaped opening 62 helps ensure that the two elements 11 are appropriately radially oriented, when placed into the housing 5.

Still referring to FIG. 3, the bolt holes are indicated generally at 64; and, a receiver groove for the o-ring is at 65.

Referring to FIG. 1, the particular pressure vessel 5 depicted, has a cylindrical outer wall 71 and a rounded bottom 72. The cylindrical outer wall 71 defines central axis 47, which generally passes through a center 75 of the rounded bottom 72.

In general, gas/liquid separators of the type of concern here are provided with one of two types of gas inlet arrangements. A first, generally referred to herein as a tangential gas inlet, is a gas inlet which has a center line directed generally tangentially with respect to the rounded or cylindrical outer wall 71. The drawings of this disclosure do not show a tangential inlet, but a conventional one could be used with many of the disclosed principles. In general, housings having tangential inlets are relatively expensive to manufacture, by comparison to the second type of gas inlet discussed below. Thus, it may be preferred to avoid tangential inlets, for cost reasons.

Figure 4:
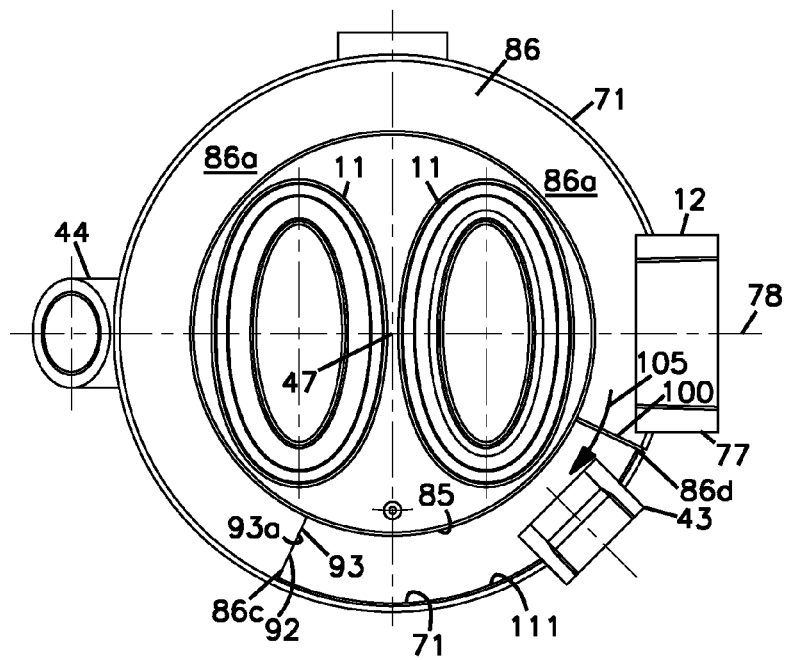
FIG. 4 is a cross-sectional view taken along line 4-4, FIG. 1.

The second type of gas inlet, shown in FIG. 4, is generally referred to herein as a "radial" or "radially directed" inlet. The particular inlet 12 depicted in FIG. 4 is a radially directed inlet 77. In general, a radially directed inlet 77 is an inlet directed with a gas flow generally toward the central longitudinal axis 47 of the pressure vessel 5. For the particular example shown, center line 78 of gas inlet 77 is directed to intersect longitudinal axis 47, although this is not specifically required.

It is noted that the outlet 13, FIG. 2, is a radial or radially directed outlet 13a, using the same definition, except for outlet flow instead of inlet flow.

It should be apparent why radial inlets (and outlets) are less expensive than tangential inlets (and outlets), to construct. In particular, a radial inlet is typically merely an aperture provided in the sidewall 71, with a feed tube or similar structure secured thereto.

Referring to FIG. 1, the assembly 1 includes a preseparation arrangement 80. In general, the preseparation arrangement 80 provides for some initial separation of gas and liquid, upon gas/liquid flow entering interior 18, through entrance or inlet 12. For the particular arrangement depicted, the preseparation arrangement 80 includes an inlet baffle arrangement 82.

The preseparation arrangement 80 may be configured generally in accord with, and under the principles of, the disclosure of U.S. provisional application 60/431,432 filed Dec. 6, 2002, the complete disclosure of which is incorporated herein by reference. Modifications in specific configuration to fit the application can readily be made.

In general terms, the inlet baffle arrangement 82 of the preseparation arrangement 80 is configured and positioned so that when liquid and gases enter inlet 12, they are moved through an arcuate path which: tends to drive a portion of the liquid into baffle or wall structure, for collection and drainage out of the gas flow; and, which directs the gases (gas/liquid mixture) into a preferred flow path, to facilitate separation. In general, a function of such an arrangement is to obtain substantial gas/liquid separation, before the gases are passed into serviceable separator unit 9, without undesirable levels of restriction.

Many air/oil separators utilized with compressors are used in circumstances in which the inlet flow includes not only oil particles entrained in gases, but also a large amount of bulk liquid oil flow. Such an oil flow into the separator assembly 1, for example, can be on the order of 8 to 100 gallons per minute (about 30-380 liters/minute). Thus, in many instances, the assembly 1 must be configured to manage a large amount of bulk oil flow, along with the gas flow and gas/liquid separation.

The particular inlet baffle arrangement 82 depicted, FIG. 2, includes axial shroud section 85; and, inlet skirt 86. The axial shroud 85 preferably comprises an outer surface to wall 28. Preferably the axial shroud 85 is generally cylindrical, and most preferably it is radially continuous.

The inlet skirt 86 is generally ring-shaped and extends radially outwardly (relative to axis 47) in extension between a point 85a adjacent the axial shroud 85 and interior surface 87 of housing wall 71. As will be apparent from the following, the particular preferred inlet skirt 86 depicted, FIG. 4, is not radially continuous. The inlet skirt 86 defines a downcomer or channel arrangement 92 (not shown in FIG. 1, see FIG. 4). In this instance the downcomer or channel 92 provides a portion 93 in inlet skirt 86 opening a space between the shroud 85 and sidewall 71. A variety of alternative downcomers could be used, the one shown involving a single space 93, being a convenient example.

Referring to FIG. 2, preferably inlet skirt 86 includes an upper surface 86a configured as a radial drainage declination surface, to cause drainage of liquid collected thereon, by gravity, toward a radially outer edge 86b of the skirt 86. In this way, liquid collected on surface 86a will tend to drain toward inner surface 87 of wall 71, FIG. 2. This will include the bulk oil flow.

Referring again to FIG. 1, as a gas/liquid combination enters pressure vessel 5 through entrance 12, the initial inlet flow is directed into preseparation arrangement 82. In the preseparation arrangement 82, the gas flow is initially directed toward axial shroud 85 and radial skirt 86. A portion of liquid contained within the gas stream, will tend to collect on the shroud 85 and radial skirt upper surface 86a. Due to the downward and outer taper or slant (decline) of the skirt 86, in extension from the shroud 85 to wall 87, the collected liquid will tend to flow under gravity, toward the outer wall 87. Eventually, the liquid will drain from the region 98, FIG. 2 (defined above skirt upper surface 86a) down into lower sump 80, by passage through downcomer or channel 92, FIG. 4. In general, bulk liquid flow toward downcomer 92 will be facilitated by the gas flow.

Referring to FIG. 4, in general, edge 86c of skirt 86 is positioned at the same axial height as is edge 86d. This will be a particularly convenient construction to manufacture. Edge 86c could alternatively be positioned slightly lower than edge 86d, to facilitate liquid drainage along surface 86a, toward gap 92; and, to facilitate gas flow maintaining a spiral flow in region 26, after passage through gap 92.

Because the inlet 12 is a radial inlet 12a, initial flow of a gas/liquid combination into the pressure vessel 5, directed toward central axis 47, is not automatically directed into a spiral flow pattern. To facilitate flow direction into a spiral pattern, the preseparation arrangement 82 includes a radial flange or vane 100 therein, FIG. 4. The flange or vane 100 extends upwardly from surface 86a in a direction opposite to the direction of declination of skirt 86 and will operate to close one direction of possible flow for inlet gases, during operation. For the particular arrangement shown in FIG. 4, the flange 100 is positioned to prevent a clockwise flow, (i.e., clockwise when viewed from the viewpoint of FIG. 4), in the direction of arrow 105. (Of course the equipment could be configured for an opposite direction of flow.) It is expected that the flange 100 will typically be located a radial spacing or distance of no more than 45°, typically no more than 30° from the closest edge of inlet 12. Indeed, vane 100 is preferably located as close to the inlet 12 as possible. Preferably vane 100 is positioned spaced radially, clockwise in the view of FIG. 4, i.e., over surface 86a, at least 200° from the edge 53a of gap 93, typically at least 230°, more preferably at least 250°.

Referring to FIG. 2, for the axial shroud 85 and skirt 86 creates an annular flow region 111 (FIG. 2) between the shroud 85 and wall inner surface 87. Relief valve tap 43 (FIG. 4) extends through wall 71 into communication with flow region 111. Typically and preferably, the relief valve tap 43 is located adjacent vane 100, on an opposite side thereof from inlet 12.

It is foreseen that in some instances it would be preferred to provide an overall cross-sectional area for region 111, i.e., a cross-sectional area for the volume defined by the outer wall 71, shroud 85 and baffle 86, which has about the same area as the cross-sectional area or inlet area of inlet 12. In this manner, the flow velocity around annulus 111 will not increase substantially relative to the flow velocity through inlet 12. Avoidance of a large increase in flow velocity in this region will generally be preferred, since it will help avoid entrainment (into the gas flow) of separated liquid.

In addition, a large flow velocity reduction in region 111 will preferably be avoided to reduce loss of centrifugal force used for separation of some liquid droplets by driving them against wall 71, while the gases flow around shroud 85. For a typical preferred arrangement, FIG. 2, the upper surface 86a of radial skirt 86 will extend in radial extension from waist or interior edge or region 113 to outer edge or exterior region 114 at a declination angle A, FIG. 2, the order of at least about 20°, typically at an angle within the range of 30° to 80° inclusive (for example 40°-70°. The term "decline" and variants thereof in this instance refers to a downward angle when the arrangement is oriented for normal use with drain 16 directed downward. In general, the choice of declination angle A will in part be a function of ensuring that the appropriate cross-sectional area 111 is provided. In addition, it will be chosen to facilitate a rate of flow of the bulk liquid or toward wall 71.

Referring to FIG. 2, preferably shroud 38 depends adequately, below skirt 86, such that gasses passing through gap 92, FIG. 4, must pass downwardly and around lower edge 38a, before passing upwardly into the serviceable separator arrangement 9. This helps avoid undesirable levels of entrainment in the gasses, as they are passed into the separator arrangement 9. The shroud 38 and skirt 86 can be parts of a single, integral, piece, as shown. Alternatively, they can be separately mounted components. Unlike skirt 86, preferably shroud 38 is radially continuous.

In the embodiment shown, the downcomer channel 92, FIG. 4, is a gap provided in skirt 86 which extends completely between shroud 85 and wall 71 (FIG. 1). An advantage to this is that as both liquid and gases flow downwardly through the downcomer or channel 92, the gases do not expand underneath the skirt 86, toward the shroud 85 or the wall 71, with a risk of re-entrainment of liquid. Typically and preferably, a radial width of the downcomer channel 92 will be at least 90% of the distance of extension of the skirt 86, between inner waist or edge 113 and outer edge 114 (or 86b). Preferably it will be at least 95% of the distance, most preferably 100% of the distance, as shown.

The downcomer or channel 92, FIG. 4, is generally located to begin at edge 93a spaced (in the direction of gas flow) at a radial position relative to center line 78 of the inlet 12, at an angle of at least 70°, typically at least 180°, often at least 230°, for the example shown about 250° to 340° around the shroud 85. Also, preferably gap or downcomer channel 92 is radially spaced at least 200° from vane 100, more preferably at least 230°, typically at least 250°, in the direction of gas flow. This will provide an increased amount of liquid separation, before gas flow can leave preseparation arrangement 80. The radial length of the skirt 86 and the downcomer channel 92 are generally a matter of choice, based upon desired flow rates and restrictions for the downcomer channel, usually a radial extension of at least about 30°, and not more than 130°, and typically 30°-80°, inclusive, for example about 40° to 60°, will be used. The term "inclusive" when used herein in reference to a range, is meant to indicate that the end points are included in the stated range. All stated ranges are intended to be "inclusive" even if the term is not specifically used.

Referring to FIG. 2, above separator sheet 28, and around separator element arrangement 9, is positioned sump 39. A suction tube 115 is shown, extending through tap 116, for draw of collected liquid material from this region.

III. Serviceable Separator Elements

Figure 6:
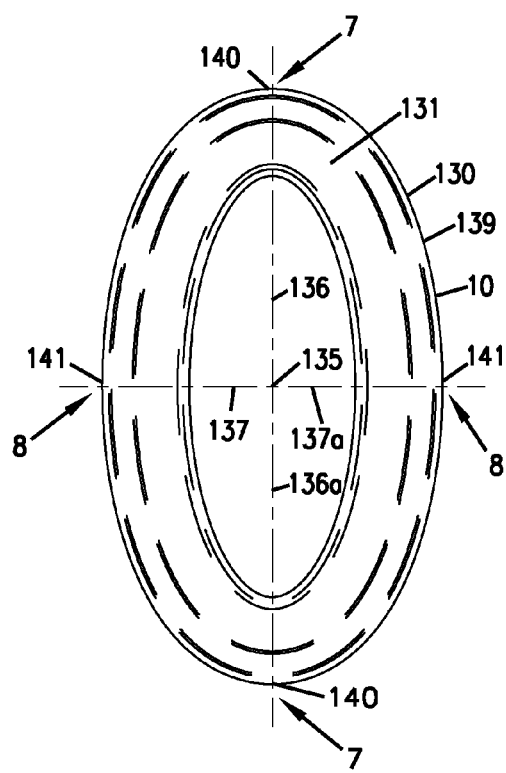
FIG. 6 is top plan view of a serviceable separator element usable in the assembly of FIGS. 1-5.

A unique and advantageous construction for the serviceable separator elements 10, is depicted in FIGS. 6-8.

A characteristic of the preferred separator elements 10 shown, is that they have perimeter shapes that are not circular in cross-section (take orthogonal to a central longitudinal axis), but rather are defined with the media pack having one long and one short cross-sectional central axis. One useable perimeter shape for the media pack is a generally obround or oval cross-section, a specific example of which is an elliptical cross-section. Examples of other possible shapes include racetrack (two parallel sides with opposite curved ends) and rectangular (with curved corners). Still other shapes are possible.

Another characteristic of the preferred separator elements 10 shown, is that they have media packs which define inner configurations, in cross-section (taken orthogonal to a central longitudinal axis) that are not circular, but rather are defined with a media pack inner surface having one long and one short cross-sectional central axis. One usable cross-sectional shape for the media pack inside surface, is generally obround or oval cross-section, a specific example of which is an elliptical cross-section matching the outer cross-section. Examples of other possible shapes include racetrack (two parallel sides with opposite or curved ends) and rectangular (with curved corners). Still other shapes are possible.

Attention is first directed to FIG. 6. FIG. 6 is a top plan view of separator element 130, which could be used as the elements 10, in the assembly of FIG. 1. Separator element 130 has an outer end cap 131. The end cap 131 is a closed end cap, and would generally be positioned analogously to end cap 50, FIG. 1, during use.

Referring to FIG. 6, it can be seen that, in cross-section, the element 130 has a center 135, with a long cross-sectional axis 136 passing therethrough, and a short cross-sectional axis 137 also passing therethrough. The long axis 136 and the short axis 137 are generally perpendicular to one another. The particular shape of the outer periphery 139 of element 130 (and its media pack) is ellipsoid, although, again, variations from an ellipse are possible. Being ellipsoid, the element 130 has two opposite, narrowly curved ends 140, separated by two curved sides 141.

Referring to FIGS. 7 and 8, it can be seen that the media pack 142 of the element 130 has a fairly constant cross-section, thus an inside cross-sectional surface 139a of element 130 (or media pack 142) has a long axis corresponding long axis 136 (FIG. 6) and a short axis corresponding to short axis 137 (FIG. 6), which are generally perpendicular to one another. The particular shape of the inner cross-section of the element (and its media pack) is ellipsoid, although, again, variations from an ellipse are possible. Being ellipsoid, the inside surface 139a has two oppositely narrowly curved ends (inside of ends 140, FIG. 6) separated by two curved sides (inside of sides 141, FIG. 6), FIGS. 7 and 8.

Herein, the term "aspect ratio" will be used to refer to the ratio of the length of the long cross-sectional axis 136 to the short cross-sectional axis 137. In typical constructions, this aspect ratio will at least 1.3, usually at least 1.5, and typically within the range of 1.5 to 2.3, inclusive, for the outer periphery of the end caps and the media pack.

Still referring to FIG. 6, long axis 136 can be viewed as defining a plane 136a extending longitudinally through the separator element 130; and axis 137 can be viewed as defining a plane 137a, extending longitudinally through the element 130 orthogonal to the first plane 136a.

Attention is again directed to FIG. 7, which is a cross-sectional view of separator element 130 taken generally along line 7-7, FIG. 6, (alternately stated, taken along the long axis 136; i.e., in plane 136a). Referring to FIG. 7, separator element 130 includes closed end cap 131 having outer perimeter or periphery 139; media pack 142, which serves the function of media pack 20, FIG. 1; and, open end cap 143, having central aperture 144 therein.

Still referring to FIG. 7, the particular end cap 143 shown includes projection or spigot 148 projecting axially outwardly therefrom, i.e., away from media pack 140. The term "axially" in this context is meant to refer to extension in a direction of extension of central longitudinal axis 149. Spigot 148 includes an outer surface with o-ring 150 thereon, for forming a seal when installed.

The aperture 144 may have any of a variety of cross-sections. It may for example be circular since its basic function is to permit the gas flow into interior 142a of media pack 142, during use. The particular aperture 144 depicted, has a preferred cross-sectional shape with a long cross-section axis and a short cross-section axis, analogously to an outside perimeter shape 139 of end cap 131 (or to an outside perimeter shape of media pack 142). Preferably the aspect ratio of the aperture 144 is at least 1.3, usually at least 1.5.

The outside surface 148a of the spigot 148, may be of any of variety of shapes. Again a shape having a circular cross-section is usable. However typically and preferably, the outside surface 148a is configured to define a perimeter having a long cross-sectional axis and a short cross-sectional axis, within aspect ratio of at least 1.3, usually at least 1.5 and typically within the range of 1.5-2.3 inclusive.

Specific construction of the media pack 142, is not critical to the general principles of assembly and configuration described herein, as a matter of choice. In general, the size and construction of the media pack 140 will be selected based upon such issues as the air flow, the level of efficiency of separation desired, the amount of restriction acceptable, the lifetime of use preferred and the size of space available.

Components of media packs for air/oil separators are described, for example, in U.S. Pat. Nos. 6,093,231; 6,136, 016; WO 99/47211; WO 99/43412; UK 1,603,519; U.S. Pat. Nos. 6,419,721; and 4,836,931, the complete disclosures of the seven identified references being incorporated herein by reference. The principles of these types of arrangements can, for example, be applied for separator units herein.

The particular media pack 142 depicted, include a coalescing stage 152 and a drain stage 153. The coalescing stage comprises appropriate material to cause coalescing of entrained liquid particles within an air stream passing into the coalescing stage. The drain stage operates to collect coalesced particles, to allow drainage into a sump around the element.

It is anticipated that the coalescing stage 152 may comprise a formed media 8. It is anticipated that the drain stage 153, at least in some instances, comprises a wrapped felt (for example formed from a felt such as a polyester felt having a weight of 10 oz/sq.yd.; a permeability of 450 cfm/ft$^2$ at 0.5 inch H$_2$O, and a nominal thickness of 0.1-0.2 inches) or air laid material, wrapped around the outside of the coalescing stage 152. (A felt could be ultrasonically welded and then inverted and slid over a central liner.)

The thickness of the coalescing stage 158 and drain stage 153 may be varied, depending on the particular system. A typical example would be: a coalescing medium having a thickness of about 0.4-0.6 inches, for example 0.5 inches; and a drain stage medium having an overall thickness of about 0.2-0.3 inches, for example 0.25 inches. For the drain stage, this could be accomplished by using two wraps of a felt as characterized.

For the particular media pack 142 depicted, a central liner 154 is contained centrally within the media pack 140. The liner would typically be a porous metal screen, such as an expanded screen or other porous structure, on which the coalescing stage 152 and drain stage 153 are supported.

Herein above, it was stated that the coalescing stage 152 may comprise formed media. In general formed media comprises media constructed by deposition of media fibers onto a former mandrel, from suspension. Adhesives may be applied and/or binder fibers may be used, to help retain the formed shape on the mandrel. An example for formation of coalescing stage 152, would be deposition of fibers from suspension, onto an elliptical inside surface of liner 154.

The media pack 142 may optionally include an inner liner, and/or an outer liner, not specifically shown.

The end caps 131, 143, may be molded or formed from metal. Typically molded end caps will be preferred, because the features shown can be readily molded. The end caps can be molded directly onto the media pack, or be premolded and secured with a potting material.

Attention is now directed to FIG. 8, which shows a cross-section of separator element 130, taken along line 8-8, FIG. 6; i.e., taken along the short axis 137 or in plane 137a.

Separator element 130 is configured for in-to-out flow during passage of gases through media pack 142, in normal operation. As a result, the coalescing stage 152 is surrounded by the drain stage 153. If the element were to be utilized in an out-to-in flow application, the coalescing stage 152 would be positioned around the drain stage 153. That is, in general media pack 142 is configured so that the first stage encountered by gas flow therethrough, is the coalescing stage.

The size of the elements, is a matter of choice for the systems involved. For the example given, a long cross-sectional dimension of about 7 inches (for example 6-8 inches), and a short cross-sectional dimension of about 4 inches (for example about 3-5 inches), will be usable, as well as sizes outside of these ranges. The overall length will vary, depending on the total flow needed through the element, for typical operation. The example lengths would be about 13 inches up to about 25 inches, depending on the system. Indeed alternate lengths can be used. As an example, an element length of about 15 inches should be sufficient, with a through put expected of about 350 standard cu./ft. per minute, per element; and a length of about 20 inches should be appropriate, with a through put expected on the order of about 450 standard cu./ft. per minute per element; for an element with a 7 inch long axis and a 4 inch short axis.

VI. A Separator Assembly Which Utilizes Only One Serviceable Separator Element Attention is now directed to FIGS. 9 and 10. In FIGS. 9 and 10, a separator assembly 155 is shown, using a single separator element. Assembly 155 may include componentry generally analogous that describe for the arrangement 1, FIGS. 1 and 2. In particular, separator assembly 155 includes: housing 156, with cylindrical side wall 156a and bottom 156b. A drain 157 is provided in the bottom 156b. Inlet 158 is viewable, as well as tube sheet structure 159, and a preseparator arrangement 160, comprising skirt 161.

The arrangement includes top 162 and serviceable separator element 163. The serviceable separator element 163 may be in accord with element 130, FIGS. 6-8.

Not viewable in FIG. 9 is the radial outlet 164, FIG. 10.

Other features generally characterized in connection with FIGS. 1-3 can be used for the arrangement of FIGS. 9 and 10, modified to accommodate the presence of a single separator element 163.

V. Advantageous Use of Separator Elements Having Non-Circular Outer Peripheries With a Long Cross-Sectional Axis and a Short Cross-Sectional Axis Non-circular outer peripheries separator elements, in accord with the disclosure herein, can be utilized to advantage. Typically such useful separators are ones that have aspect ratios, as characterized above. Preferred use of these, will be understood by reference to the depictions of FIGS. 5, 10 and 11.

Referring to FIG. 10, a depiction is presented, showing a gas/liquid separator assembly 155 having a circular outer wall 156, with a top removed.

In general, it is preferred to provide a distance X, between an outer surface of a gas/liquid separator 163 and an outlet 164, to provide good flow without undesirable turbulence or undesirable levels of liquid reaching the outlet, for a typical system, FIG. 10, using a single element, a distance X on the order of about 0.9 to 3 inches would by typical.

If the separator 163 were simply round in cross-section, and such a space X was maintained, the surface area of the separator would be less, than with the obround shape shown having an aspect ratio as shown. It is noted that a preferred orientation for the separator element 163, is with short axis 170 directed toward the outlet 164, and the long axis 171 extending generally perpendicular to a center line of the outlet 164. (Alternately stated, the element 168 is preferably positioned with a longitudinal cross-sectional plane 171a in which the long axis 171 resides, positioned orthogonal to a center line of the outlet 164.

In order to achieve the preferred orientation shown in FIG. 10, between the rotational orientation of the separator element 163, and the gas outlet 164, the assembly 155 can be provided with orientation features. For example, a separator 163 can be provided with a elliptical spigot 148, FIGS. 7-8, which can only engage an analogously-shaped portion of the tube sheet during sealing, when the separator element 163 is in appropriate rotational orientation, around a central longitudinal axis 149, FIGS. 7 and 8, relative to outlet 164, FIG. 10. For the particular arrangement shown in FIG. 10, there would only be two such feasible rotational orientations, and they would be the same due to an overall symmetry of the shape of element 163 (as mirror images) on each side of plane 171a. (In FIG. 10, bolt holes are shown at 173.)

In addition, region 180 of the housing 196, FIG. 9, can be provided with an inner aperture shape through which the element 163 can only pass if it is oriented appropriately, with respect to the long and short cross-section axis. It could be done, for example, by providing section 180 with an aperture therein defining a similar elliptical shape with the same aspect ratio, assuming the separator 163 used is one having an elliptical shape.

Figure 5:
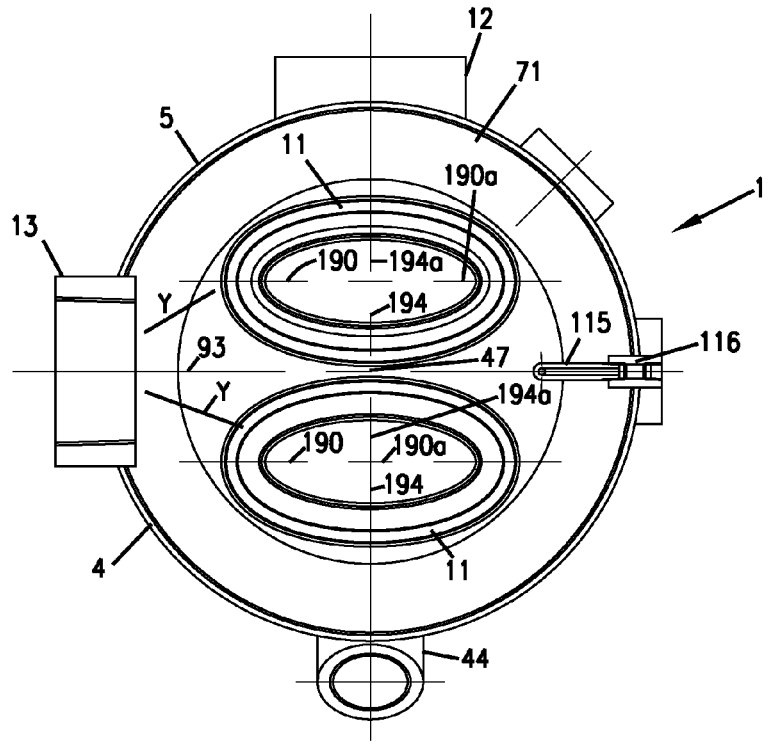
FIG. 5 is a cross-sectional view taken along line 5-5, FIG. 2.

The unique configurations of separator elements disclosed herein, are also advantageous in applications in which the assembly includes more than one separator element therein. An example of this is shown in FIG. 5. For the particular arrangement shown, the elements 11 are positioned with long axes 190 or planes 190a parallel to one another. The elements 11 are spaced from one another (although they could touch) on opposite sides of a center line 193, which extends through outlet 13. The elements 11 are preferably positioned with the long cross-sectional axes 190 or planes 190a generally parallel to center line 193. Further, the elements 11 are preferably positioned with a short cross-sectional axes 194 or planes 194a parallel to, and preferably co-planar, with one another, passing through center axis 47, of the circular sidewall 5 of housing 4.

This orientation positions two elements 11 with relatively large media pack surface areas, within a single, circular outer wall 5, while maintaining a substantial spacing Y between each element 185 and outlet 182. Again, Y would be chosen to ensure good flow and avoidance of an undesirable amount of liquid reaching the outlet. For a typical two element system of the type shown, a distance Y on the order of at least about 1.2 inches should be sufficient.

The top piece 200 of sidewall 5, FIG. 3 is shown with an aperture shape at 62 facilitating proper alignment of the elements 11 upon installation.

As with the arrangement of FIGS. 9 and 10, the elements 11 could be constructed with a spigot analogous to spigot 148, FIGS. 7 and 8, which can only properly engage for sealing, with the element 11 appropriately radially positioned.

Figure 11:
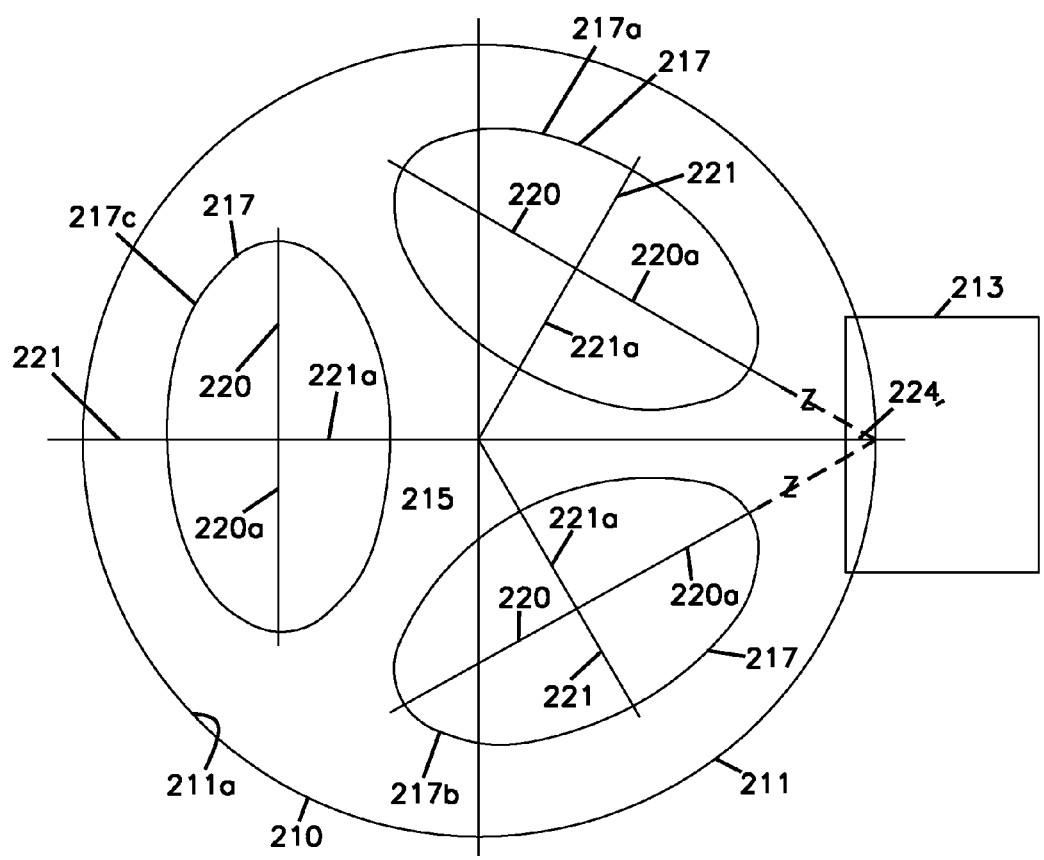
FIG. 11 is a schematic top view of a gas/liquid separator assembly having three serviceable separator elements therein, depicted with the top cover removed.

An arrangement in which three serviceable separator elements are positioned, is shown in FIG. 11. Referring to FIG. 11, at 210 gas/liquid separator assembly is shown schematically. The gas/liquid separator assembly 210 has a housing 211 with a circular outer wall 211a. A gas outlet 213 is shown, as a radially directed outlet. At 215, central axis for circular housing 211 is shown, analogous to axis 47, FIG. 1.

Three identically sized and shaped elements 217 are shown positioned within interior 218. Each element 217 has a long cross-sectional axis 220 or plane 220a and a short cross-sectional axis 221 or plane 221a, preferably with an aspect ratio of as described above. The elements 217 are positioned with a short axis 221 directed toward central axis 215, and a spacing Z. For a three element system, Z should be selected to avoid undesirable levels of liquid from reaching the outlet, while providing good flow characteristics. For a typical three element system of the type shown, a distance Z on the order of at least about 1.5 inches should be sufficient.

The elements 217 are also positioned such that the long axes 220 of a first two (217a, 217b) of the elements are directed toward the outlet 213 and such that a third one of the elements (217c) is positioned with its long axis 220 (and plane 220a) generally perpendicular to a central line 224 of the outlet 213. This is accomplished by having the element 217c with its long axis 220 perpendicular to line 224, be the furthest one of the elements 217c spaced from the outlet 213. It can be seen from a review of FIG. 11, that the shape of the elements 217 allows for positioning of three elements within a circular space, with a relatively large total amount of outer peripheral media pack surface of the elements 217 available (by comparison to circular elements).

VI. Depictions of an Example Air/Oil Separator Element, FIGS. 12-15

Figure 12:
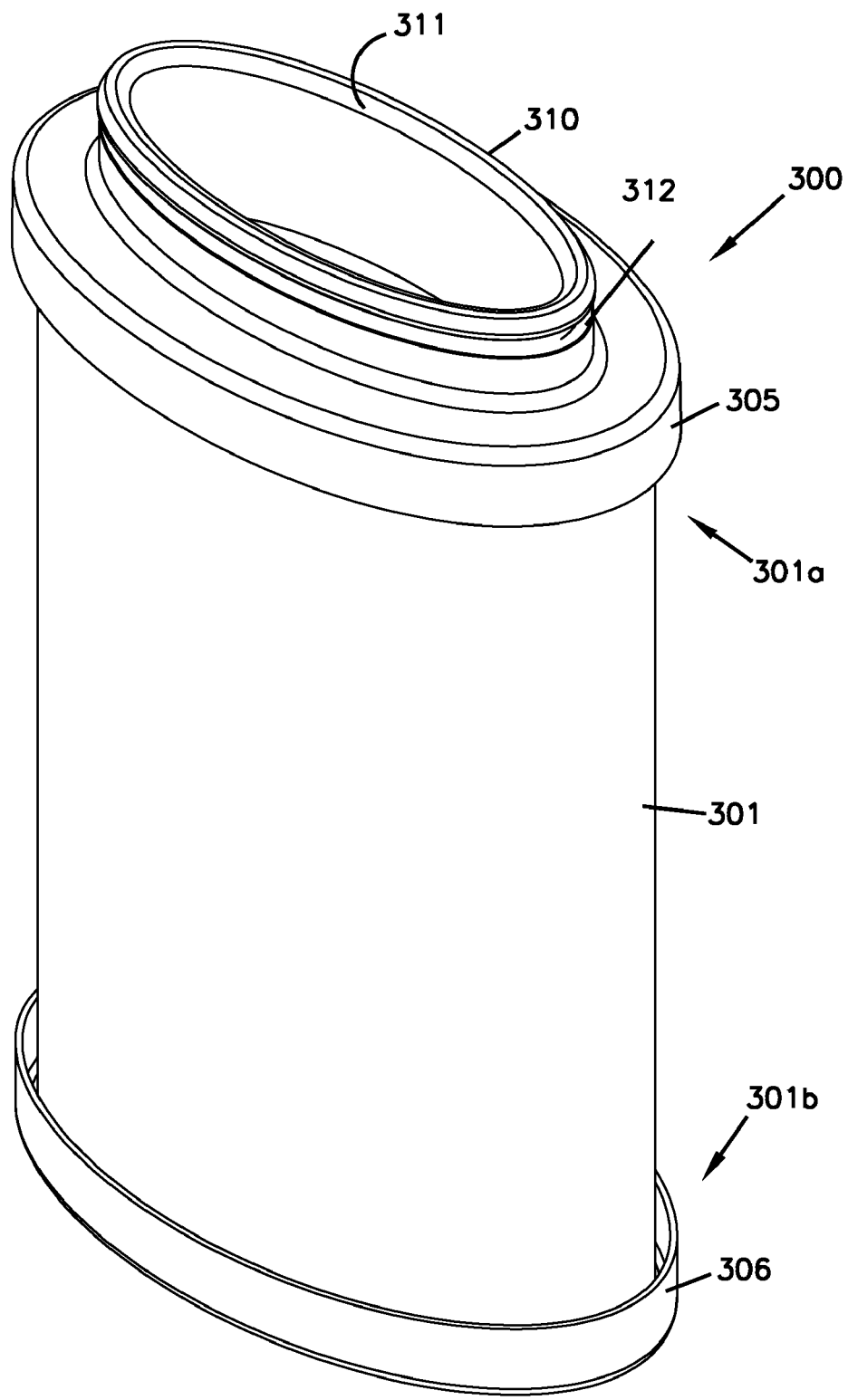
FIG. 12 is a perspective view of a second embodiment of a serviceable separator element, useable in the assembly of FIG. 1.

In FIGS. 12-15, an air/oil separator element 300 is depicted, which can be used as a separator element in assemblies as previously discussed. Referring to FIG. 12, separator element 300 comprises a media pack 301 positioned in extension between a first, open, end cap 305 and a second, closed, end cap 306. The media pack may be as generally described hereinabove, typically possessing both a coalescing stage and a drain stage. Various liners and separators can be included within the media pack 301, in general accord with the principles discussed above.

The open end cap 305 is positioned on a first end 301a of the media pack 301. The end cap 305 includes spigot 310 having an open aperture 311. The spigot 310 has an elliptical shape. The spigot 310 includes groove 312, for positioning therein of an o-ring.

Still referring to FIG. 12, end cap 306 is a closed end cap, and is secured to end 301b of the media pack 301.

Figure 13:
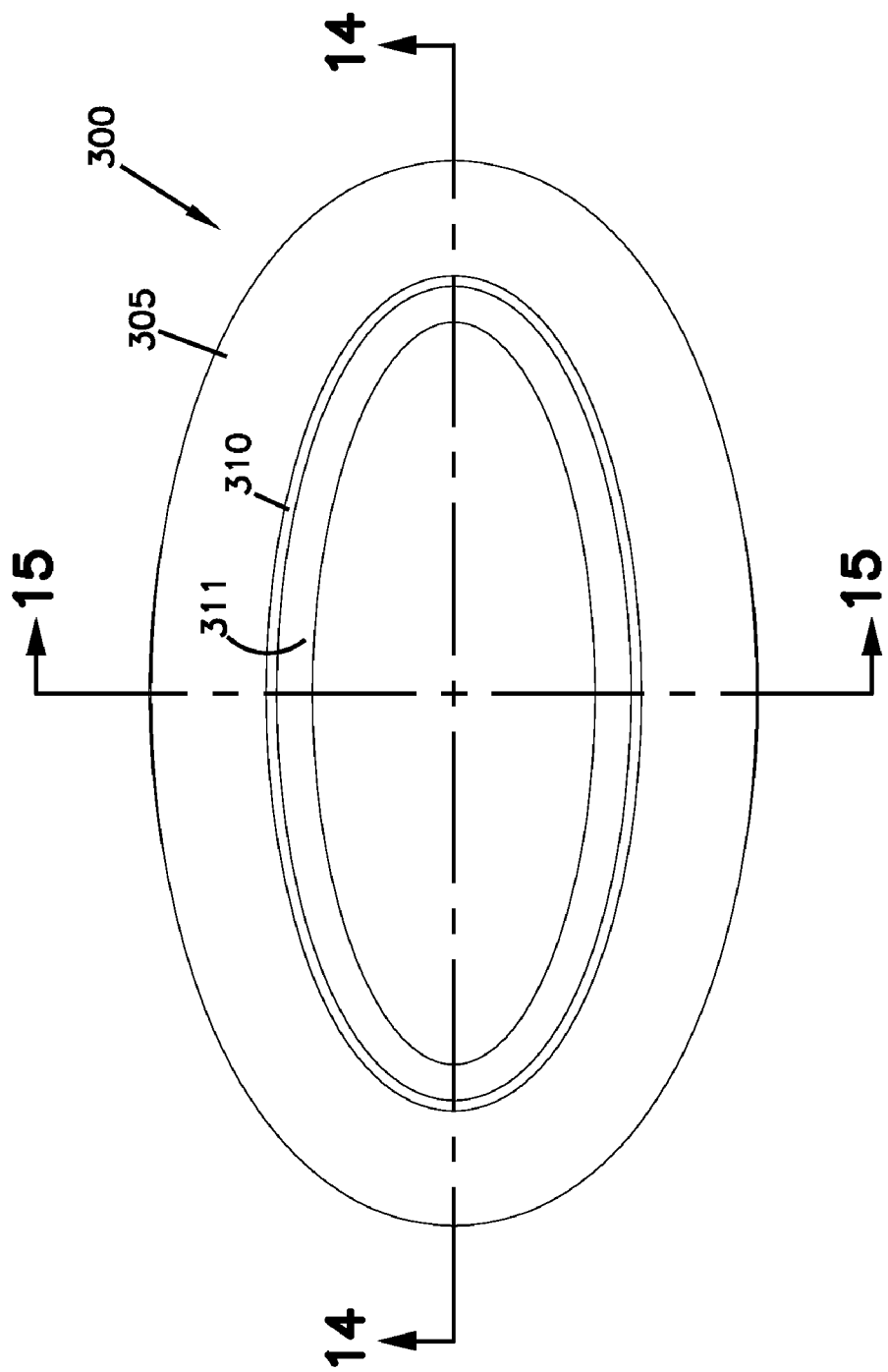
FIG. 13 is a top plan view of the separator element of FIG. 12.

In FIG. 13, a top plan view of the elliptical air/oil separator element 300 is depicted, i.e., in FIG. 13 the element 300 is viewed toward end cap 305.

Figure 14:
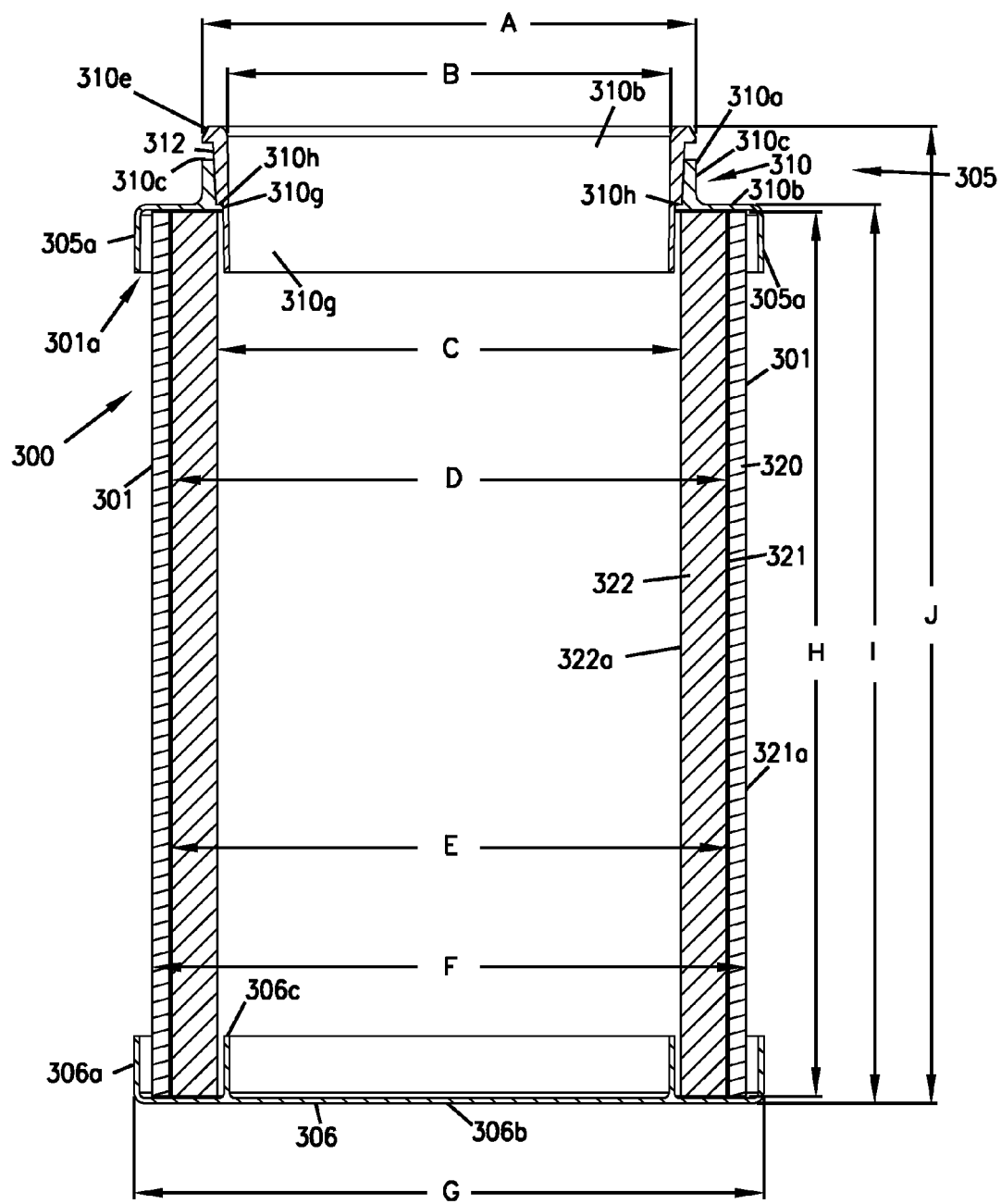
FIG. 14 is a cross-sectional view taken along line 14-14, FIG. 13.

In FIG. 14, elliptical air/oil separator element 300 is depicted in cross-sectional view, taken along line 14-14, FIG. 12. In FIG. 14, it can be seen that the end cap 310 is formed from two parts: piece 310a, which is secured to an end of the media pack 301; and, piece 310b, which is secured inside of stem 310c of piece 310a.

More specifically, piece 310 includes shoulder 310b and axial projecting stem 310c. The stem 310c has an elliptical shape. Piece 310b includes upper outwardly directing projection 310e and shoulder 310f, along with inner projection 310g. Piece 310b is inserted into an aperture defined by stem 310a, until shoulder 310f engages shelf 310h of piece 310c. Shoulder 310f of piece 310b is positioned such that when it is stopped, by engagement with shelf 310h, o-ring gap 312 is positioned formed between projection 310e and stem 310c. In this manner, if desired, an o-ring can be formed in a two-piece end cap, without the need for a machining operation to form the groove. The pieces 310a, 310b can each be metal pieces, or molded plastic pieces, as desired.

Of course end cap 310 could be a single molded piece or single machined piece, if desired. When end cap 310 is formed in two pieces as shown, the two pieces 310a, 310b can be secured to one another in a variety of means including by welding or with adhesive or by other similar effective approaches.

End cap 305 includes rim 305a, which surrounds end 301a of media pack 301. Referring to FIG. 14, end cap 306 includes outer side wall 306a, end wall 306b and inner ring projection 306c. End cap 306 can be formed from a single piece, for example a metal piece or a molded plastic piece, or it could be formed in two or more pieces, as desired.

It is noted that rim 306a and rim 305a for end cap 310; each is positioned spaced radially outwardly from the media pack 301. This is not required.

However using a size such as this for certain end caps allows various sized media packs to be set into the same pair of end caps, where the size varies somewhat in media pack thickness. This can be advantageous for some applications.

Still referring to FIG. 14, it is noted that the particular media pack 301 depicted comprises outer drain stage media 320, an inner media liner 321 and inner coalescing stage 322. Of course additional structure such as an inner liner or an outer liner could be used.

Figure 15:
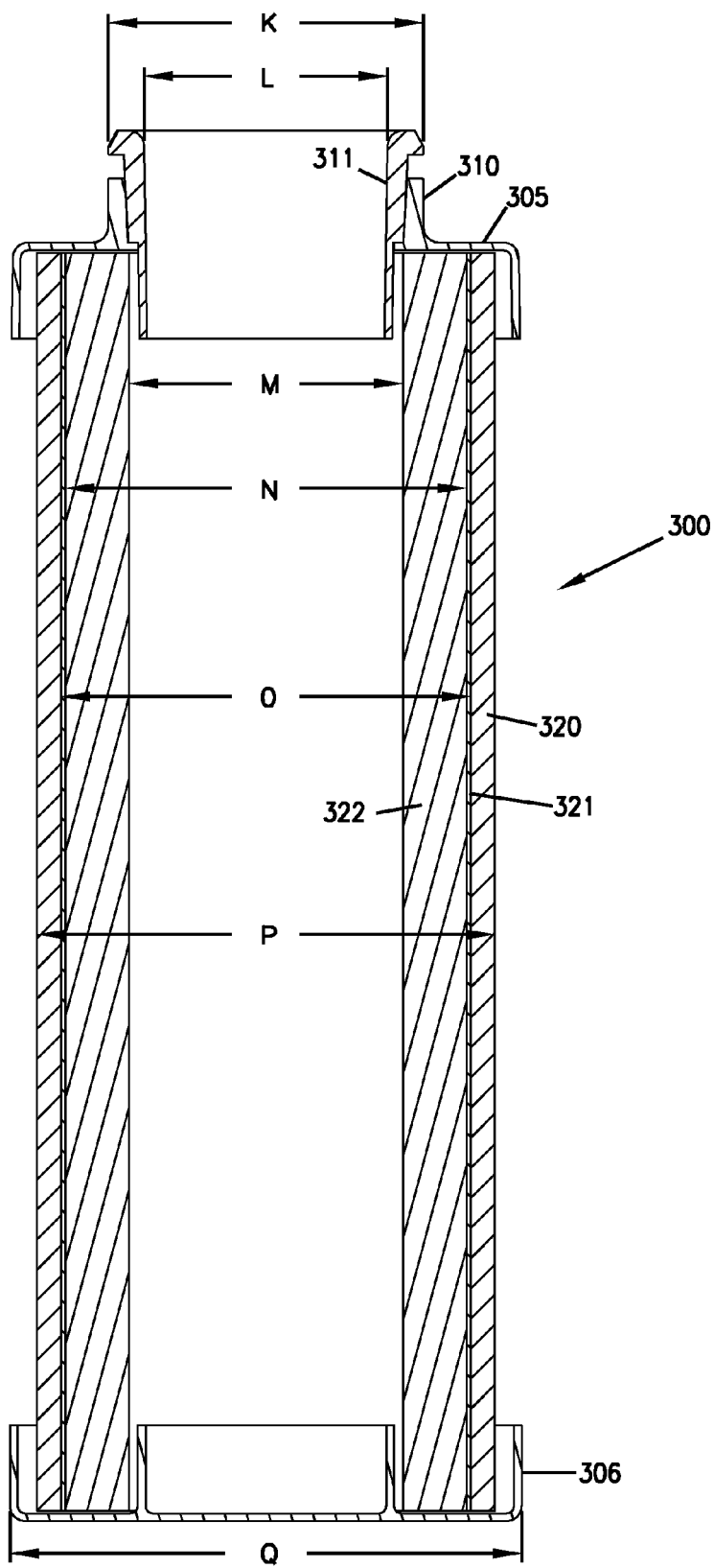
FIG. 15 is a cross-sectional view taken along line 15-15, FIG. 13.

In FIG. 15, another cross-sectional view of element 300 is depicted, in this instance taken along the shorter axis.

For typical preferred elements in accord with the construction of FIGS. 12-15, preferred aspect ratios of the longer dimension to the shorter dimension for the various parts would be as follows:

1. For the outer perimeter of closed end cap 306, preferably the aspect ratio for the longer elliptical axis to the shorter elliptical axis would be at least 1.3, usually at least 1.5 and typically within the range of 1.5-2.3 inclusive. An example would be 1.65-1.85.
2. The outer peripheral rim 305a of the open end cap 305, would have similar preferred aspect ratios as stated in the previous paragraph for the closed end cap 306.
3. The ellipse formed by projection 310e, on end cap 310, preferably has an aspect ratio (longer elliptical axis to shorter elliptical axis) of at least 1.3, usually at least 1.5 and typically within the range of 1.5-2.5. An example would be about 2.1-2.4. This range of ratios would, of course, also correspond to the seal dimensions.
4. For the element configured in FIGS. 12-15, the elliptical aperture 311 would preferably have the following aspect ratios, for longer elliptical axis to shorter elliptical axis: at least 1.3, usually at least 1.5 and typically within the range of 1.5-3.0. An example would be 2.4-2.7.

5. The inside surface 322*a* of the coalescing stage media 322, would typically have an aspect ratio (longer elliptical axis to shorter elliptical axis) of at least 1.3, typically at least 1.5 and usually within the range of 1.8-2.6, inclusive. An example would be about 2.2-2.6.

6. The outside surface of 321*a* of the drain stage 321 would typically have an aspect ratio (longer elliptical axis to shorter elliptical axis) of at least 1.3, typically at least 1.5, and usually within the range of 1.5-2.3, inclusive. An example would be 1.65-2.1.

In FIGS. 14 and 15, some letter designations are provided, to allow identification of example dimensions. Although a variety of different sized units can be made, these dimensions will help indicate general construction that is useable for example systems of the type described, or which can be adapted by modification in size for application to a variety of still more systems. The indicated dimensions are as follows:

A=139.4 mm (5.49 inch);
B=125.2 mm (4.93 inch);
C=131.1 mm (5.16 inch);
D=156.5 mm (6.16 inch);
E=158.0 mm (6.22 inch) (dimension to outside of liner);
F=167.6 mm (6.60 inch);
G=177.8 mm (7.0 inch)
H=249.9 mm (9.84 inch);
I=254.0 mm (10 inch);
J=276.2 mm (10.88 inch);
K=63.2 mm (2.49 inch);
L=49.0 mm (1.93 inch);
M=54.9 mm (2.16 inch);
N=80.3 mm (3.16 inch);
O=81.8 mm (3.22 inch) (dimension to outside of liner);
P=91.4 mm (3.60 inch); and
Q=101.6 mm (4.0 inch).

Of course a variety of alternate air/oil separator elements, of different dimensions, can be used employing principles according to the present disclosure.

What is claimed is:

1. A gas/liquid separator assembly comprising:
   (a) a media pack defining an open interior and comprising media for coalescing and draining liquid; and
   (b) an outwardly directed spigot having a seal structure thereon and gas inlet flow aperture therethrough;
      (i) the seal structure having a non-circular perimeter with a long axis and a short axis and a ratio of length of long axis to short axis of at least 1.3;
      (ii) the media pack being oriented to engage structure on which the spigot is positioned so that gas flow through the gas inlet flow aperture is in communication with the open interior defined by the media pack; and
      (iii) the gas inlet flow aperture being positioned for directing gas/oil to be separated into the open interior defined by the media pack.

2. A gas/liquid separator assembly according to claim 1 wherein:
   (a) the spigot is secured to an end cap.

3. A gas/liquid separator assembly according to claim 1 wherein:
   (a) the spigot is not separable from the media pack.

4. A gas/liquid separator assembly according to claim 1 wherein:
   (a) the spigot is on an end cap such that the spigot and end cap comprise two pieces.

5. A gas/liquid separator assembly according to claim 1 wherein:
   (a) the media pack includes a drain stage surrounding a coalescing stage.

6. A gas/liquid separator assembly according to claim 5 wherein:
   (a) the drain stage comprises different media from the coalescing stage.

7. A gas/liquid separator assembly according to claim 1 wherein:
   (a) the media pack extends between first and second, opposite, end caps.

8. A gas/liquid separator assembly according to claim 7 wherein:
   (a) one of the end caps is closed; and
   (b) the spigot is a portion of another one of the end caps.

9. A gas/liquid separator assembly according to claim 1 wherein:
   (a) the media pack has a non-circular cross-section taken orthogonal to a central longitudinal axis.

10. A gas/liquid separator assembly according to claim 1 wherein:
    (a) the media pack has an oval cross-section.

11. A gas/liquid separator assembly according to claim 1 wherein:
    (a) the media pack has an elliptical cross-section.

12. A gas/liquid separator assembly according to claim 1 wherein:
    (a) the media pack has a cross-section periphery with a perimeter shape having a long cross-sectional axis, a short cross-sectional axis and an aspect ratio of at least 1.3.

13. A gas/liquid separator assembly according to claim 1 wherein:
    (a) the media pack cross-sectional periphery has a ratio of the length of the long axis to the short axis within the range of 1.5 to 2.3, inclusive.

14. A gas/liquid separator assembly according to claim 13 wherein:
    (a) the spigot has a cross-sectional outer periphery shape with a ratio of the length of the long axis to the short axis of at least 1.5.

15. A gas/liquid separator assembly according to claim 14 wherein:
    (a) the spigot has an outer periphery with a ratio of the length of the long axis to the short axis within the range of 1.5-2.5.

16. A gas/liquid separator assembly according to claim 14 wherein:
    (a) the spigot has an outer periphery with a ratio of the length of the long axis to the short axis within the range of 2.1-2.4.

17. A gas/liquid assembly element according to claim 1 including:
    (a) the seal structure is a radial seal structure comprising an o-ring positioned on an exterior of the spigot.

18. A gas/liquid separator assembly according to claim 1 wherein:
    (a) the coalescing stage comprises media positioned against an interior surface of an elliptical porous tube.

19. An assembly for gas/liquid separation comprising a gas/liquid separator assembly including a media pack defining an open interior and comprising media for coalescing and draining liquid; and an outwardly directed spigot having a seal structure thereon and gas flow aperture therethrough; the seal structure having a non-circular perimeter with a long axis and a short axis and a ratio of length of long axis to short axis of at least 1.3; and the media pack being oriented to engage structure on which the spigot is positioned so that gas flow through the gas flow aperture is in communication with the open interior defined by the media pack; the assembly comprising:
- (a) a vessel including: an outer wall; a gas flow inlet, a gas flow outlet; and, a lower sump;
- (b) a tube sheet arrangement separating the vessel into an upper region and a lower region;
  - (i) the tube sheet arrangement being positioned so that the gas flow inlet is in direct communication with the lower region and the gas flow outlet is positioned to receive gas flow directly from the upper region;
- (c) the gas/liquid separator assembly operably secured to the tube sheet arrangement in a position with a media pack projecting into the upper region and with the spigot removably sealed to the tube sheet; wherein
  - (i) the gas flow outlet is a radial outlet with a radially directed outlet axis;
  - (ii) the assembly includes only one separator assembly; and
  - (iii) the separator assembly includes a media pack with a long cross-sectional axis and is positioned with the long cross-sectional axis generally orthogonal to the outlet axis.

20. The assembly according to claim 19 wherein:
- (a) the media pack has an oval cross-section.

21. The assembly according to claim 19 wherein:
- (a) the media pack has a cross-section periphery with a perimeter shape having a long cross-sectional axis, a short cross-sectional axis and an aspect ratio of at least 1.3.

22. The assembly according to claim 19 wherein:
- (a) the media pack includes a drain stage surrounding a coalescing stage.

23. The assembly according to claim 22 wherein:
- (a) the drain stage comprises different media from the coalescing stage.

24. The assembly according to claim 19 wherein:
- (a) the media pack extends between first and second, opposite, end caps.

25. The assembly according to claim 24 wherein:
- (a) one of the end caps is closed; and
- (b) the spigot is a portion of another one of the end caps.

26. An assembly for gas/liquid separation comprising a gas/liquid separator assembly including a media pack defining an open interior and comprising media for coalescing and draining liquid; and an outwardly directed spigot having a seal structure thereon and gas flow aperture therethrough; the seal structure having a non-circular perimeter with a long axis and a short axis and a ratio of length of long axis to short axis of at least 1.3; and the media pack being oriented to engage structure on which the spigot is positioned so that gas flow through the gas flow aperture is in communication with the open interior defined by the media pack; the assembly comprising:
- a vessel including: an outer wall; a gas flow inlet, a gas flow outlet; and, a lower sump;
- (b) a tube sheet arrangement separating the vessel into an upper region and a lower region;
  - (i) the tube sheet arrangement being positioned so that the gas flow inlet is in direct communication with the lower region and the gas flow outlet is positioned to receive gas flow directly from the upper region;
- (c) the gas/liquid separator assembly operably secured to the tube sheet arrangement in a position with a media pack projecting into the upper region and with the spigot removably sealed to the tube sheet; wherein
  - (i) the gas flow outlet is a radial outlet with a radially directed outlet central axis;
  - (ii) the assembly includes only three separator assemblies each of which includes a media pack with a long cross-sectional axis and a short cross-sectional axis;
  - (iii) a first two of the three separator assemblies are each positioned with:
    - (A) the outlet central axis directed between them; and
    - (B) with a longer cross-sectional axis of the media pack of each of the first two of the three separator assemblies directed toward the gas flow outlet; and,
  - (iv) a third one of the three separator assemblies is positioned with:
    - (A) the outlet central axis intersecting the media pack of the third separator assembly; and
    - (B) a longer cross-sectional axis of the third separator element generally orthogonal to the outlet central axis;
  - (v) the third separator assembly being positioned further from the outlet than the first two of the separator assemblies.

27. The assembly according to claim 26 wherein:
- (a) each of the three separator assemblies an outwardly directed spigot having a seal structure thereon and gas flow aperture therethrough; the seal structure having a non-circular perimeter with a long axis and a short axis and a ratio of length of long axis to short axis of at least 1.3.

28. The assembly according to claim 27 wherein:
- (a) the media pack for each of the three separator assemblies includes a drain stage surrounding a coalescing stage.

29. The assembly according to claim 28 wherein:
- (a) the drain stage comprises different media from the coalescing stage.

30. The assembly according to claim 28 wherein:
- (a) the media pack for each of the three separators each extends between first and second, opposite, end caps.

31. The assembly according to claim 30 wherein:
- (a) one of the end caps is closed for each of the three separators; and
- (b) the spigot for each of the three separators is a portion of another one of the end caps.

32. A method of separating oil from a gas/oil stream; the method comprising steps of:
- (a) directing a gas/oil stream through a central gas flow aperture of a spigot having a non-circular perimeter with a long axis and a short axis and a ratio of long axis to short axis of at least 1.3;
  - (i) the spigot having a seal structure thereon;
- (b) from the spigot, directing the gas/oil mixture through an open end cap and into an open interior of a media pack;
- (c) directing flow of the gas/oil mixture from the interior into the media pack in an in-to-out flow direction; and
- (d) within the media pack, coalescing and draining oil from the gas.

* * * * *

UNITED STATES PATENT AND TRADEMARK OFFICE
CERTIFICATE OF CORRECTION

PATENT NO. : 8,394,164 B2
APPLICATION NO. : 13/452069
DATED : March 12, 2013
INVENTOR(S) : Casey et al.

It is certified that error appears in the above-identified patent and that said Letters Patent is hereby corrected as shown below:

In the Claims

Col. 18, line 27, claim 27: "separator assemblies an outwardly" should read --separator assemblies includes an outwardly--

Signed and Sealed this
Twenty-second Day of October, 2013

Teresa Stanek Rea
*Deputy Director of the United States Patent and Trademark Office*